(12) United States Patent
Fornage

(10) Patent No.: US 6,519,338 B2
(45) Date of Patent: Feb. 11, 2003

(54) TONE BURST GENERATOR AND ITS APPLICATION TO TELEPHONY

(75) Inventor: Martin Fornage, Petaluma, CA (US)

(73) Assignee: Advanced Fibre Communications, Inc., Petaluma, CA (US)

( * ) Notice: Subject to any disclaimer, the term of this patent is extended or adjusted under 35 U.S.C. 154(b) by 0 days.

(21) Appl. No.: 09/059,135

(22) Filed: Apr. 13, 1998

(65) Prior Publication Data

US 2002/0003872 A1 Jan. 10, 2002

(51) Int. Cl.$^7$ .......................... H04M 1/00; H04M 17/00
(52) U.S. Cl. ........................................ 379/361; 379/146
(58) Field of Search ...................... 379/132, 143–146, 379/153–155, 235, 359–361, 387, 399, 401, 402, 406, 373.01, 374.01–374.03; 381/123; 327/90–96; 331/74–76, 87, 107 R, 108 R, 109; 333/174

(56) References Cited

U.S. PATENT DOCUMENTS

| | | | | |
|---|---|---|---|---|
| 3,735,055 A | * | 5/1973 | Thomas | 379/410 |
| 3,764,753 A | * | 10/1973 | Wisotzky | 379/235 |
| 3,873,937 A | * | 3/1975 | Lindstrum | 331/75 |
| 4,018,126 A | * | 4/1977 | Walmann | 333/174 |
| 4,484,036 A | * | 11/1984 | Lyle et al. | 379/373.01 |
| 5,373,552 A | * | 12/1994 | Fite et al. | 379/146 |
| 6,127,856 A | * | 10/2000 | Ueda | 327/94 |

OTHER PUBLICATIONS

"Functional Description and Applications Information," *Telecommunications Circuits Databook* by Ericsson, 1994, p. 4–152.

"Analog Line Card Products—Protection Switches SLIC Codec Ringing," *Data Book 1997–1998* by the Microelectronics Group of Lucent Technologies, Bell Labs Innovations, Feb. 1997, pp. 4–5.

* cited by examiner

*Primary Examiner*—Sinh Tran
*Assistant Examiner*—George Eng
(74) *Attorney, Agent, or Firm*—Pillsbury Winthrop LLP

(57) ABSTRACT

A differential pair of a first and a second transistor is used in a tone burst generator circuit for generating tone bursts for periodic pulse metering. The first transistor carries all of the current through the differential pair when no tone burst signal is to be generated. When a tone burst signal is to be generated, the base or gate voltage of the first transistor is reduced relative to the base or gate voltage of the second transistor, thereby causing the second transistor to conduct and the first transistor to be turned off. A continuous tone signal connected to a common current path through the differential pair is then coupled through the second transistor to a telephone connection in order to apply a tone burst signal to the connection. When a tone burst signal is to be decoupled from the connection, the base or gate voltage of the first transistor is raised to a level above that of the second transistor, again causing all of the current through the differential pair to flow through the first transistor, thereby turning off the second transistor. This decouples the continuous tone signal from the telephone connection. A RC delay circuit is employed to control the rise and fall times of the tone burst signal.

11 Claims, 4 Drawing Sheets

TONE BURST GENERATOR AND ITS APPLICATION TO TELEPHONY

BACKGROUND OF THE INVENTION

This invention relates in general to tone burst generators, and more particularly, to such generators used in telephony suitable for periodic pulse metering.

In some telephone line circuits, such as those used at public telephones, it is desirable to include tone burst generators. The generators transmit tone bursts to telephone station equipment for the purpose of incrementing call cost meters so that coin collection may be controlled at public or other telephones where toll is charged based on the time duration for calls. A key consideration in the design of such generators is to avoid audible noise caused by the tone bursts. For each telephone line circuit that is periodic pulse metered, a tone burst generator is required. It is, therefore, important to reduce the costs of such generators.

Tone burst generators have been proposed using inductors or 4-quadrant linear multiplier circuits which are expensive. Another tone burst generator is proposed in U.S. Pat. No. 5,373,552. While the above tone burst generators are useful for some applications, they are not entirely satisfactory. It is, therefore, desirable to provide an improved tone burst generator with superior characteristics.

SUMMARY OF THE INVENTION

One aspect of the invention is directed towards a tone burst generator comprising means for generating a continuous tone signal and a circuit converting said continuous tone signal into a tone burst signal having predetermined transition times, said circuit including a differential pair of a first and a second transistor, a common current path coupling the continuous tone signal to the differential pair and means for turning on and off one of the transistors to provide a tone burst signal having said predetermined transitions.

Another aspect of the invention is directed towards an apparatus for transmission of telephone signals comprising a transmission circuit including at least one first connection transmitting the telephone signals from a telephone company station to a subscriber location and at least one second connection receiving telephone signals from the subscriber location and transmitting such signals to the telephone company station and at least one generator supplying to said at least one first connection a tone burst signal having predetermined transitions. The at least one generator comprises means for generating a continuous tone signal; a differential pair of a first and a second transistor; a common current path coupling the continuous tone signal to the differential pair and means for turning on and off one of the transistors to provide a tone burst signal having predetermined transitions to provide to said at least one first connection a tone burst signal having said predetermined transitions.

BRIEF DESCRIPTION OF THE DRAWINGS

For simplicity, identical components are identified by the same numerals in this application.

DETAILED DESCRIPTION OF THE PREFERRED EMBODIMENT

Figure 1:
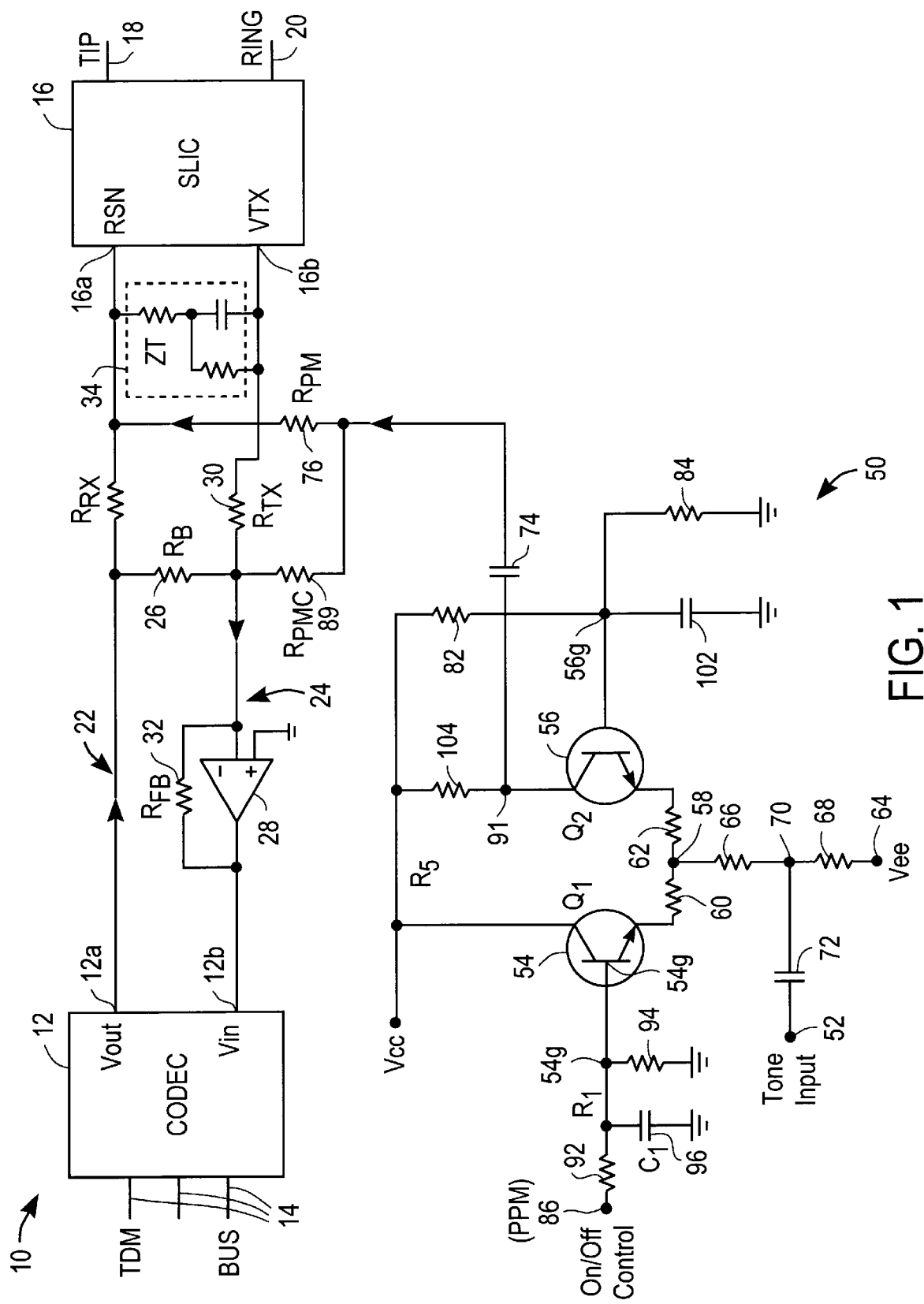
FIG. 1 is a schematic circuit diagram of a transmission circuit for transmitting telephone signals between a telephone company station and a subscriber location and a tone burst generator supplying a tone burst signal to the transmission circuit to illustrate the preferred embodiment of the invention.

As shown in FIG. 1, a transmission circuit 10 includes a coder/decoder (CODEC) 12 receiving telephone signals from a telephone company station (not shown) along time division multiplex bus 14 for transmission to the subscriber location (not shown), and sending telephone signals from the subscriber location to the telephone company station along bus 14. Transmission circuit 10 also includes a Subscriber Line Interface Circuit (SLIC) 16, typically an integrated circuit, which is connected to a subscriber location (not shown) by means of TIP line 18 and RING line 20. CODEC 12 transmits telephone signals received from bus 14 and transmits them through output 12a (signals at voltage Vout) along connection 22 to input 16a (RSN) of SLIC 16, where SLIC 16 sends the signal along the TIP and RING lines 18 and 20 to the subscriber. SLIC 16 also receives telephone signals from the subscriber along lines 18, 20 and sends such signals from output 16b at voltage VTX along connection 24 to the input Vin of CODEC 12.

Connection 24 is connected to connection 22 by means of a resistor 26 with resistance $R_B$ and connection 24 also includes in its path an operational amplifier 28 and resistor 30 with value $R_{TX}$, where the two resistors and the operational amplifier are used for echo cancellation in the manner described, for example, in the *Telecommunication Circuit Databook* by Ericsson Components AB (1994), at page 4–152. As described by Ericsson, echo cancellation is accomplished if the following holds:

$$\frac{VTX}{R_{TX}} + \frac{V_{OUT}}{R_B} = 0 \tag{1}$$

where VTX is the voltage applied by SLIC 16 to connection 24 at output 16b and $V_{OUT}$ is the output voltage applied by CODEC 12 to connection 22 at output 12a.

As shown in FIG. 1, operational amplifier 28 has a negative feedback path through a resistor 32. An impedance matching circuit 34 with impedance ZT is connected between the connections 22, 24.

FIG. 1 also shows a tone burst generator circuit 50 for generating a tone burst signal applied to the transmission circuit 10. A continuous tone from an oscillator (not shown) is supplied to terminal 52 and generator circuit 50 converts the continuous tone and signal into a tone burst having predetermined transition times for application to the transmission circuit 10. Generator circuit 50 employs a differential pair of transistors 54, 56 whose emitters are connected to a common node 58 through one of a pair of resistors 60, 62 of small values, such as about 10 Ohms, where the common node 58 is connected to a voltage reference $V_{ee}$ at terminal 64 through two resistors 66 and 68. The continuous tone signal at terminal 52 is coupled to node 70 between resistors 66 and 68 through a capacitor 72. The collector of transistor 56 or $Q_2$ is coupled to connection 22 through a capacitor 74 and resistor 76 of resistance $R_{PM}$. Thus, when transistor 56 or $Q_2$ conducts, the continuous tone signal at terminal 52 is applied to connection 22 of the transmission circuit 10. By controlling the turning on and off of transistor 56, it is possible to cause a tone burst signal having predetermined transition times to be applied to connection 22. The tone burst signal is, in turn, conveyed by SLIC 16 to the wires 18, 20 for periodic pulse metering purposes.

The turning on and off of transistor 56 will now be described. As shown in FIG. 1, the gate of transistor 56 is biased at a fixed DC level by means of a voltage divider circuit comprising resistors 82, 84 and voltage supply $V_{cc}$. When no tone burst signal is to be applied to the transmission circuit 10, the gate of transistor 54 is biased at a voltage higher than that applied to the gate of transistor 56, so that all of the current through the differential pair 54, 56 flows through transistor 54, so that the continuous tone signal at terminal 52 is not coupled to connection 22. But when a PPM enable signal is applied to terminal 86, the voltage at the gate of transistor 54 or $Q_1$ is reduced, thereby also reducing the current flowing through the transistor. Further reduction of the gate voltage of transistor 54 causes the transistor 54 or $Q_1$ to be turned off so that all of the current through the differential pair now flows through transistor 56 or $Q_2$. The continuous tone signal applied to terminal 52 is then coupled through transistor 56 or $Q_2$ to the connection 22.

Figure 2:
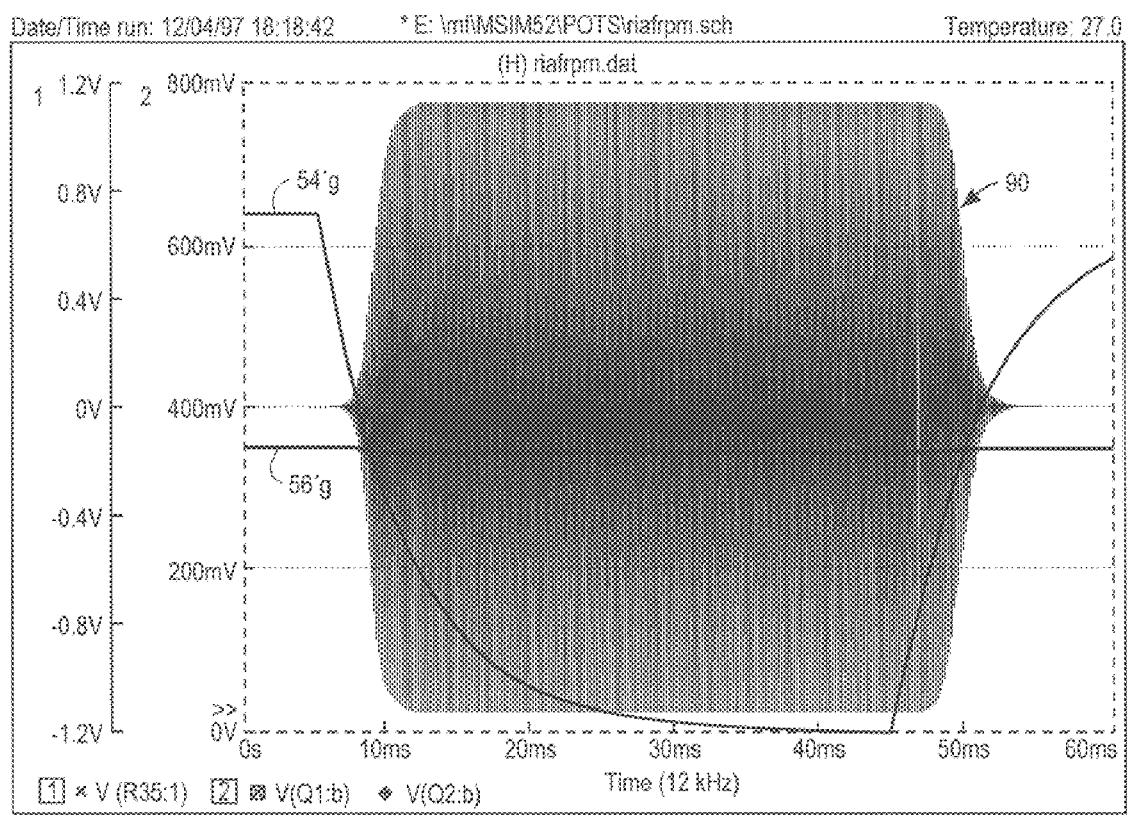
FIG. 2 is a graphical plot of the tone burst signal supplied by the tone burst generator of FIG. 1 to the transmission circuit and of a control signal applied. to the tone burst generator to illustrate the invention.

In reference to FIGS. 1 and 2 and in the preferred embodiment, the gate 56g of transistor 56 or $Q_2$ is maintained at a constant voltage 56g' of about 350 millivolts, and when no tone burst signal is to be applied to the transmission circuit 10, the DC voltage is applied to terminal 86 so that the voltage 54g' at gate 54g of transistor 54 or $Q_1$ is at about 750 millivolts. As shown in FIG. 1, this can be accomplished by choosing the appropriate values for resistors 92 and 94 which form a voltage divider circuit and the appropriate DC voltage at terminal 86. When a tone burst signal is to be sent to the transmission circuit 10, this DC voltage at terminal 86 is decreased to ground. Since the gate 54g is connected to ground through capacitor 96, the RC delay caused by resistor 92 and capacitor 96 causes the voltage 54g' of gate 54g to be reduced gradually, as illustrated by curve 54g' in FIG. 2, and of a tone burst signal 90 at node 91 that is applied to the transmission circuit 10. In FIG. 2, the curve illustrating the gate voltage of transistor 54 is labelled 54g' and the tone burst signal is labelled 90.

The values of resistors 82, 84 are chosen in the preferred embodiment so that the gate 56g of transistor 56 or $Q_2$ is maintained at about 350 millivolts. As the gate voltage of transistor 54 or $Q_1$ falls to about 375 millivolts, the transistor 56 or $Q_2$ begins to conduct. In reference to FIG. 2, this happens at about 8 or 9 milliseconds from an arbitrary reference zero seconds. Also, at about this time, the continuous tone signal applied to terminal 52 begins to be coupled to connection 22 through transistor 56, capacitor 74 and resistor 76 and is illustrated as curve 90 in FIG. 2. When the gate voltage 54g falls below 350 millivolts, transistor 56 or $Q_2$ becomes fully conducting so that the amplitude of the tone burst reaches its full amplitude at about 10 or 11 milliseconds from time zero. Thus, by controlling the DC voltage applied to terminal 86, it is possible to cause a tone burst signal to be applied to connection 22 of transmission circuit 10 at a predetermined transition time. By employing a RC delay circuit between the PPM enable signal applied to terminal 86 and the gate 54g of transistor 54, it is also possible to control the tone burst signal so that it has a rise time of not less than about 100 microseconds, although in the preferred embodiment, the rise time of tone burst signal 90 is not less than about 1 millisecond. By causing the tone burst signal to have a minimum rise time, audible noise caused by the tone burst signal to subscribers is reduced.

As shown in FIG. 2, the gate voltage of transistor 54 continues to fall until it is close to ground. When the tone burst signal is to be turned off, the DC voltage applied to terminal 86 is raised, so that the gate voltage at gate 54g returns gradually to 750 millivolts, again due to the delay effect of resistor 92 and capacitor 96. When the gate voltage 54g rises to above 350 millivolts (the voltage maintained at gate 56g of transistor 56 or $Q_2$), transistor 56 or $Q_2$ begins to turn off, thereby gradually decoupling the continuous tone signal applied to terminal 52 from connection 22 of circuit 10, until at about 50 milliseconds from time zero, the continuous tone signal is completely decoupled from circuit 10. Therefore, by controlling the DC voltage level at terminal 86, it is possible to cause the turning off of the tone burst signal at a predetermined transition time. The RC delay effect of resistor 92 and capacitor 96 causes the tone burst signal to have a fall time of not less than 100 microseconds, and of not less than about 1 millisecond in the preferred embodiment.

While in the embodiment above, the turning on and off of transistor 56 is accomplished by maintaining gate 56g at a substantially constant voltage and changing the gate voltage of transistor 54, it will be understood that substantially the same effect can be achieved by maintaining the gate 54g of transistor 54 constant and changing the gate voltage of transistor 56. Such and other variations are within the scope of the invention.

In the preferred embodiment, the voltage reference $V_{ee}$ at terminal 64 is a negative potential such as about −5 volts, although other reference potentials such as ground may be adequate. The two resistors 60, 62 of small values render the differential pair more tolerant of differences between the characteristics of the two transistors so that commercial transistors may be used to reduce costs. While bipolar transistors are illustrated in FIG. 1, it will be understood that field effect transistors may be used instead and are within the scope of the invention. When field effect transistors are used, the sources of the transistors are connected to node 58 through resistors 60, 62, their drains connected to $V_{cc}$ and node 91, and their gates are at the same positions 54g, 56g as the bipolar transistors.

As in the case of voice signals, an echo of the tone burst signal may also appear on connection 24. Cancellation of such echo can be achieved if the resistances $R_{TX}$, $R_{PM}$ of resistors 30, 76 and value ZT of impedance 34 are chosen so that the following holds:

$$R_{PMC} = R_{TX} \times \frac{R_{PM}}{ZT} \times \frac{\frac{ZT}{1000} + 2R_F + Z_L}{Z_L + 2R_F} \tag{2}$$

where ZT is the impedance of impedance 34, $R_{TX}$ the resistance of resistor 30, $R_{PM}$ the resistance of resistor 76, $R_{PMC}$ the resistance of resistor 89 of FIG. 1, $R_F$ the resistance of the line feed or fuse resistor (not shown), and $Z_L$ is the line impedance, and where the ratio ZT/1000 depends on the type of SLIC used and can be different for different SLICs. For a more detailed description related to equation (2) above, please see *Telecommunication Circuit Databook* by Ericsson Components AB (1994), page 4–152.

Figure 3:
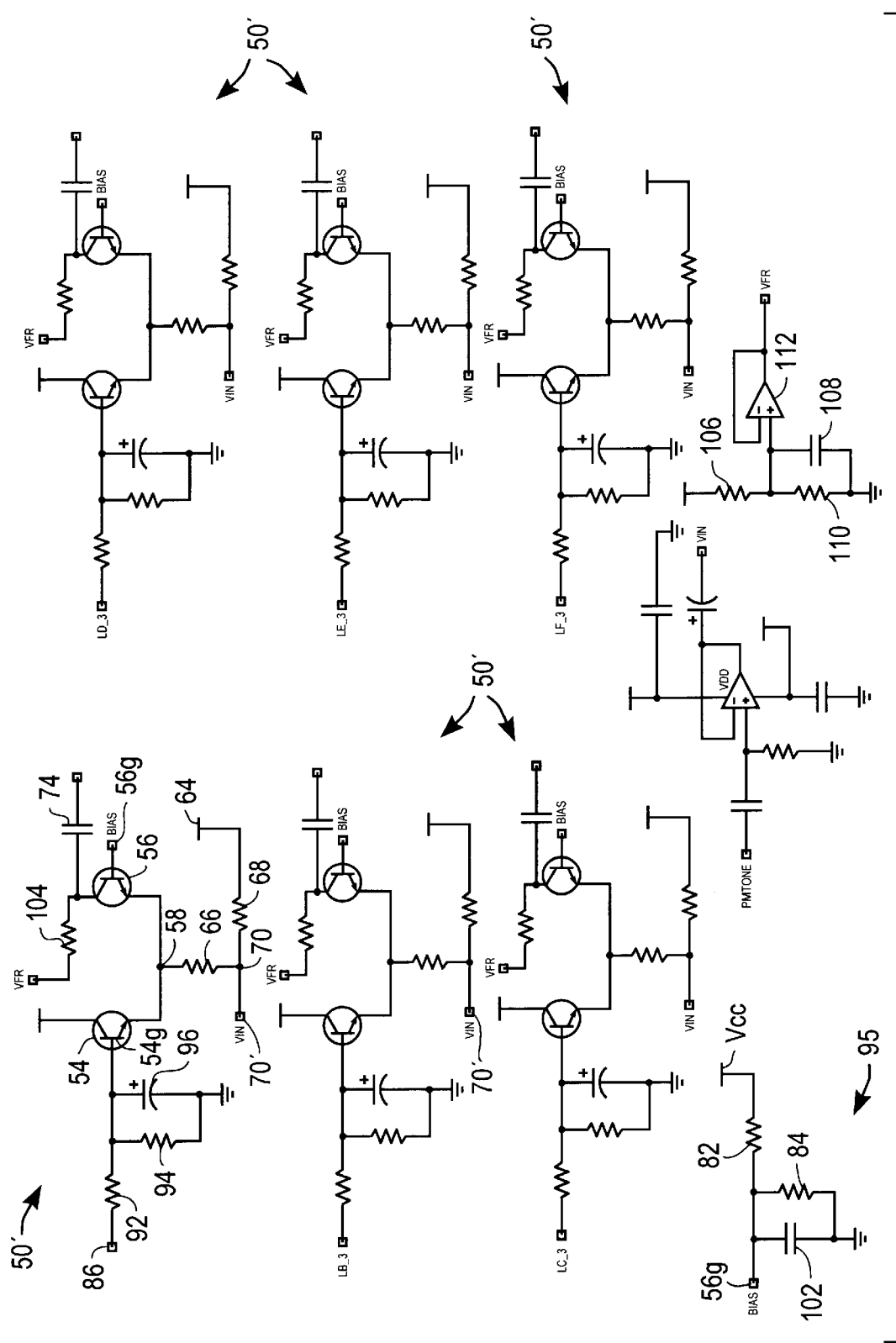
FIG. 3 is a schematic circuit diagram of six tone burst generator circuits, a common bias circuit and a common low noise power rail circuit to illustrate a preferred embodiment of the invention.

Telephone equipment frequently includes more than one transmission circuit 10 of FIG. 1, so that a tone burst generator 50 would need to be employed for each pair of such connections 22, 24 in such circuit. FIG. 3 is a schematic circuit diagram of six identical tone burst generator circuits 50' substantially the same as generator circuit 50 of FIG. 1 for supplying tone burst signals to six corresponding transmission circuits (not shown) of the type shown in FIG. 1 to illustrate the preferred embodiment of the invention, it being understood that the concept can be extended to any number of transmission circuits. Since potentially a large number of tone burst generator circuits may be employed, to reduce costs, it may be possible to design the tone burst generator circuits so that they can share common components. Thus, it may be possible for all six circuits of FIG. 3 to share the common terminals 70 (shown as VIN and 70' in FIG. 3), 58, resistors 66, 68 and voltage reference $V_{ee}$, terminal 64 of FIG. 1 and a continuous tone input is applied through a capacitor (not shown) to terminal 70'.

It may also be possible for the six tone burst generator circuits to share the same voltage divider circuit 95 for biasing gates 56g of transistors 56 at the terminals BIAS, as shown in FIG. 3. Thus, all six tone burst generator circuits share the same voltage divider circuit 95 formed by resistors 82, 84 and a voltage reference of +5 volts, as well as capacitor 102. In FIG. 1, the collector of transistor 54 is connected to voltage reference $V_{cc}$ and the collector of transistor 56 is connected to the same reference through a resistor 104.

If the voltage reference $V_{cc}$ is noisy, such noise will be coupled through resistor 104 to connection 22. This is undesirable. For this reason, in the preferred embodiment as illustrated in FIG. 3, a low noise voltage reference at node VFIL is used instead and connected to the collector of transistor 56 through resistor 104. The same low noise voltage reference may be used for all six generator circuits, as shown in FIG. 3. The low noise voltage reference is obtained by connecting a commercial voltage reference of +5 volts through a low pass filter comprising resistor 106 and capacitor 108., and by using a voltage divider circuit comprising resistors 106 and 110 and an operational amplifier 112 in negative feedback mode. The output of operational amplifier 112 is then used as the low noise voltage reference and applied to node VFIL in FIG. 3.

Figure 4:
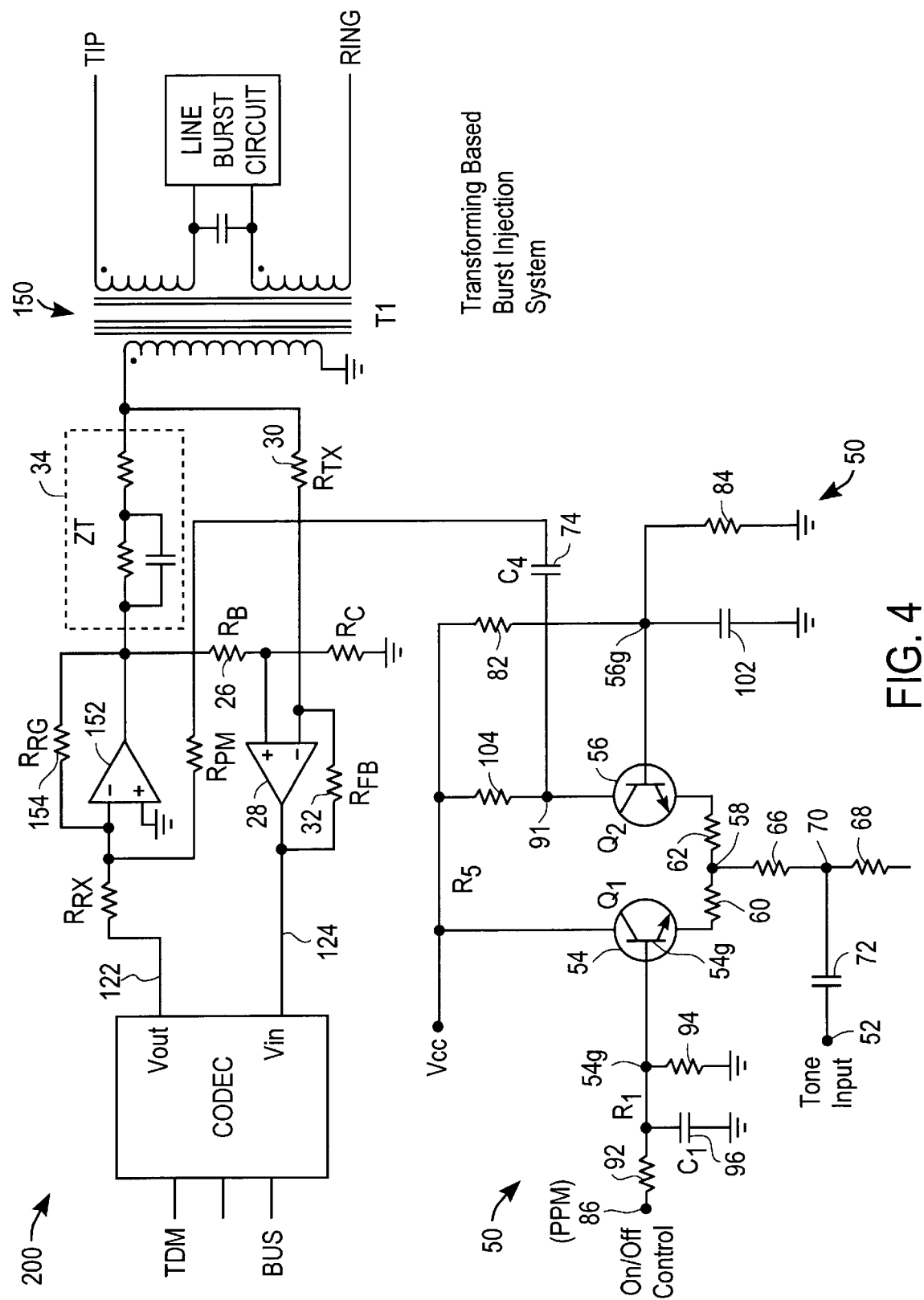
FIG. 4 is a schematic circuit diagram of a transmission circuit for transmitting telephone signals between a telephone company station and a subscriber location and a tone burst generator supplying a tone burst signal to the transmission circuit, similar to the embodiment of FIG. 1, but where a transformer is used in the transmission circuit to illustrate an alternative embodiment of the invention.

Instead of using a subscriber line interface circuit 16, which is typically an integrated circuit, it is possible to replace such circuit by a transformer as indicated in FIG. 4. As shown in FIG. 4, the telephone signals and connections 122 and 124 are coupled to the TIP and RING lines through a transformer 150. Subscriber loops using transformers are known to those skilled in the art. For example, see *Databook* 1997–1998, issued by the Microelectronics Group of Lucent Technologies for Analog Line Card Products.

Echo cancellation is accomplished by employing an additional operational amplifier 152 in connection 122, in negative feedback mode through resistor 154. By feeding back a portion of the signal at the output of operational amplifier 152 to the positive input of operational amplifier 28 through a resistor 26, and by choosing appropriate resistor values for resistors 26 and 154, according to equation 1 above, echos of voice signals appearing in connection 124 is cancelled by such feedback action. Such feedback also cancels the tone burst signal that is coupled to connection 122 from the collector of transistor 56. Other than such differences, the transmission circuit 200 and tone burst generator circuit 50 operate essentially as described above for transmission circuit 10 and generator 50 to inject a tone burst signal at predetermined transition times and of desired rise and fall times to connection 122.

In the embodiment of FIG. 3, the values of the resistors and capacitors are listed below, where the left column indicates the numbers used in this application to identify the components, and the right column their corresponding values:

| | |
|---|---|
| 66 | 1.4 kΩ |
| 68 | 2.43 kΩ |
| 74 | 1.5 nF |
| 82 | 10 kΩ |
| 84 | 750 Ω |
| 92 | 10 kΩ |
| 94 | 1.5 kΩ |
| 96 | 4.7 uF |
| 102 | 100 nF |
| 104 | 2 kΩ |
| 106 | 9.09 kΩ |
| 108 | 100 nF |
| 110 | 80.6 kΩ |

While the invention has been described above by reference to various embodiments, it will be understood that different changes and modification may be made without departing from the scope of the invention which is to be defined only by the appended claims and their equivalents.

What is claimed is:

1. A tone burst generator comprising:
    means for generating a continuous tone signal; and
    a first circuit converting said continuous tone signal into a tone burst signal having predetermined transition times, said first circuit including:
        a differential pair of a first and a second transistor, said pair amplifying a voltage difference between two control inputs;
        a common current path coupling the continuous tone signal to the differential pair; and
        a second circuit turning on and off one of the transistors to provide a tone burst signal having said predetermined transitions, said second circuit applying a control signal to the first transistor, said generator further comprising a second current path connected to the second transistor so that a tone burst signal having said predetermined transitions is provided by the second current path; and
        means for biasing the second transistor at a predetermined voltage.

2. The generator of claim 1, said control signal having two voltage levels, said predetermined voltage being between the two voltage levels.

3. The generator of claim 1, said biasing means including a voltage divider circuit.

4. Apparatus for transmission of telephone signals comprising:
    a first transmission circuit including at least one first connection transmitting the telephone signals from a telephone company station to a subscriber location and at least one second connection receiving telephone signals from the subscriber location and transmitting such signals to the telephone company station; and
    at least one generator supplying to said at least one first connection a tone burst signal having predetermined transitions, said at least one generator comprising:
        means for generating a continuous tone signal;

a differential pair of a first and a second transistor, said pair amplifying a voltage difference between two control inputs;

a common current path coupling the continuous tone signal to the differential pair, and a second circuit turning on and off one of the transistors to provide a tone burst signal having said predetermined transitions to provide to said at least one first connection a tone burst signal having said predetermined transitions, said second circuit applying a control signal to the first transistor, said apparatus further comprising a second current path connected to the second transistor so that a tone burst signal having said predetermined transitions is provided by the second current path, and means for biasing the second transistor at a predetermined voltage.

5. The apparatus of claim 4, said control signal having two voltage levels, said predetermined voltage being between the two voltage levels.

6. The apparatus of claim 4, said biasing means including a voltage divider circuit.

7. The apparatus of claim 4, said transmission circuit comprising a plurality of said first connections, and a plurality of said tone burst generators, each of said plurality of tone burst generators supplying a tone burst signal to a corresponding first connection, the second transistor of each of said plurality of generators being biased by the same biasing means.

8. An apparatus for transmitting telephone signals, the apparatus comprising:

a common node having a steady current flowing through tile common node;

a first transistor having a first control terminal, the steady current flowing through the first transistor and the common node having a voltage on the first control terminal turns on the first transistor;

a second transistor having a second control terminal, the steady current flowing through the second transistor and the common node when the second transistor is turned on, the first transistor being turned off when the second transistor is turned on, the second transistor being turned off when the first transistor is turned on;

a tone burst circuit connected to the common node that outputs a continuous tone burst signal to the common node;

a bias circuit connected to the second control terminal, the bias circuit applying a steady voltage to the second control terminal; and an input circuit having an input node, and an output node connected to tile first control terminal, the input circuit applying a second voltage to the first control terminal via the output node when the first transistor is to be turned on, and a third voltage to the first control terminal via the output node when the first transistor is to be turned off, the steady voltage having a value between the second and third voltages.

9. The apparatus of claim 8 wherein a transition occurs at the input and the output when a voltage on the first control node changes between the second and third voltages.

10. The apparatus of claim 9 wherein the transition at the output has a longer rise time that the transition at the input.

11. An apparatus for transmitting telephone signals, the apparatus comprising:

a common node having a steady current flowing through the common node;

a first transistor having a first control terminal, the steady current flowing through the first transistor and the common node when a voltage on the first control terminal turns on the first transistor;

a second transistor having a second control terminal, the steady current flowing through the second transistor and the common node when the second transistor is turned on, the first transistor being turned off when the second transistor is turned on, the second transistor being turned off when the first transistor is turned on;

a tone burst circuit connected to the common node that outputs a continuous tone burst signal to the common node;

a transmission circuit connected to the second transistor, the transmission circuit including;

a coder/decoder circuit;

a subscriber line interface circuit;

a connecting circuit connected to the coder/decoder circuit and the subscriber line interface circuit, the connecting circuit being connected to the second transistor;

a bias circuit connected to the second control terminal, the bias circuit applying a steady voltage to the second control terminal; and an input circuit having an input node, and an output node connected to the first control terminal, the input circuit applying a second voltage to the first control terminal via the output node when the first transistor is to be turned on, and a third voltage to the first control terminal via the output node when the first transistor is to be turned off, the steady voltage having a value between the second and third voltages.

* * * * *